United States Patent
Moon et al.

(10) Patent No.: US 9,955,284 B2
(45) Date of Patent: Apr. 24, 2018

(54) APPARATUS AND METHOD FOR OPERATING AD-HOC MODE IN WIRELESS COMMUNICATION NETWORK

(71) Applicants: Samsung Electronics Co., Ltd., Suwon-si (KR); Industry-University Cooperation Foundation Hanyang University, Seoul (KR)

(72) Inventors: Hichan Moon, Seoul (KR); Yong-Seok Park, Seoul (KR); Ki-Seok Lee, Yongin-si (KR); Kyung-Tae Chung, Seoul (KR)

(73) Assignee: SAMSUNG ELECTRONICS CO., LTD. (KR)

(*) Notice: Subject to any disclaimer, the term of this patent is extended or adjusted under 35 U.S.C. 154(b) by 110 days.

(21) Appl. No.: 14/967,031

(22) Filed: Dec. 11, 2015

(65) Prior Publication Data
US 2016/0174016 A1    Jun. 16, 2016

(30) Foreign Application Priority Data

Dec. 12, 2014 (KR) .................. 10-2014-0179822

(51) Int. Cl.
*H04W 4/00* (2009.01)
*H04W 40/24* (2009.01)
(Continued)

(52) U.S. Cl.
CPC .......... *H04W 4/005* (2013.01); *H04W 8/005* (2013.01); *H04W 40/244* (2013.01); *H04W 56/0025* (2013.01); *H04W 84/18* (2013.01)

(58) Field of Classification Search
CPC combination set(s) only.
See application file for complete search history.

(56) References Cited

U.S. PATENT DOCUMENTS

| | | | |
|---|---|---|---|
| 7,920,545 B2* | 4/2011 | Eguchi ................ | H04W 56/00 370/311 |
| 8,233,505 B2* | 7/2012 | Birru ..................... | H04W 16/14 370/252 |

(Continued)

FOREIGN PATENT DOCUMENTS

KR    20140054175    5/2014

OTHER PUBLICATIONS

Standard ECMA-387, High Rate 600 GHz PHY, MAC and PALs, 2nd Edition, 302 pages, Dec. 2010.*

*Primary Examiner* — Frank Duong
(74) *Attorney, Agent, or Firm* — McAndrews, Held & Malloy, Ltd.

(57) ABSTRACT

The present disclosure relates to a sensor network, machine type communication (MTC), machine-to-machine (M2M) communication, and technology for internet of things (IoT). The present disclosure may be applied to intelligent services based on the above technologies, such as smart home, smart building, smart city, smart car, connected car, health care, digital education, smart retail, security and safety services. A method for transmitting a beacon frame signal by a transmitting node in a wireless communication network is provided. The method includes transmitting a first type beacon frame signal; and transmitting a second type beacon frame signal after preset time from time at which the first type beacon frame signal is transmitted, wherein nodes other than the transmitting node are incapable of transmitting the first type beacon frame signal while the first type beacon frame signal is transmitted, and wherein the nodes other than the transmitting node are capable of transmitting the second type beacon frame signal while the second type beacon frame signal is transmitted.

20 Claims, 9 Drawing Sheets

(51) Int. Cl.
*H04W 8/00* (2009.01)
*H04W 56/00* (2009.01)
*H04W 84/18* (2009.01)

(56) References Cited

U.S. PATENT DOCUMENTS

| | | | |
|---|---|---|---|
| 8,867,498 B2* | 10/2014 | Chen | H04W 74/06 370/328 |
| 2014/0206407 A1 | 7/2014 | Kim et al. | |
| 2014/0269558 A1 | 9/2014 | Sartori et al. | |
| 2014/0321360 A1 | 10/2014 | Han et al. | |

* cited by examiner

APPARATUS AND METHOD FOR OPERATING AD-HOC MODE IN WIRELESS COMMUNICATION NETWORK

RELATED APPLICATION(S)

This application claims the benefit under 35 U.S.C. § 119(a) of a Korean patent application filed in the Korean Intellectual Property Office on Dec. 12, 2014 assigned Serial No. 10-2014-0179822, the entire disclosure of which is incorporated herein by reference.

BACKGROUND

The present disclosure relates to an apparatus and a method for operating an Ad-hoc mode in a wireless communication network, and more particularly, to an apparatus and a method for operating an Ad-hoc mode based on a power managing scheme and a neighbor node discovering scheme in a wireless communication network.

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the big data processing technology through connection with a cloud server, has emerged.

As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched.

Such an IoT environment may provide intelligent Internet technology services that create a new value to human life by collecting and analyzing data generated among connected things. The IoT may be applied to a variety of fields including smart home, smart building, smart city, smart car or connected cars, smart grid, health care, smart appliances and advanced medical services through convergence and combination between existing information technology (IT) and various industrial applications.

Generally, configuring an Ad-hoc network of an Institute of Electrical and Electronics Engineers (IEEE) 802.11 system is a technology for acquiring time synchronization among nodes included in a related network. In the Ad-hoc network of the IEEE 802.11 system, power consumption of the nodes included in the related network changes according to whether it is possible to acquire the time synchronization among the nodes included in the related network.

Meanwhile, a beacon frame signal specified in the IEEE 802.11 system includes time-stamp information indicating time which a network manages. As such, in the IEEE 802.11 system, nodes included in a specific network may acquire time synchronization among the nodes based on time-stamp information included in a beacon frame signal.

Meanwhile, in an infrastructure mode of the IEEE 802.11 system, an access point (AP) periodically transmits a beacon frame signal, and stations (STAs) which are connected to the AP maintain a network connection based on the beacon frame signal which the AP transmits. Here, time at which it is expected that each beacon frame signal will be received will be referred to as 'target beacon transmission time (TBTT)'.

In an Ad-hoc mode of the IEEE 802.11 system, there is no node which performs an operation like in an AP, so STAs which exist in a related network transmit a beacon frame signal alternately and randomly at each TBTT. In the Ad-hoc mode, each node does not transmit a beacon frame signal any more until the nets TBTT after detecting a beacon frame signal in a related network.

In the IEEE 802.11 system, a technology for detecting whether there is a neighbor node is very important. Specially, in the Ad-hoc network of the IEEE 802.11 system, it is very important for a related node to detect a neighbor node and channel status between the related node and the detected neighbor node in a view of routing and interference control.

As such, in an Ad-hoc network of an IEEE 802.11 system, a beacon frame signal is used for a related node to acquire time synchronization among nodes included in a related network, and detect a neighbor node and channel status between the related node and the detected neighbor node.

A process for transmitting a beacon frame signal in an Ad-hoc network of a conventional IEEE 802.11 system will be described with reference to FIG. 1.

FIG. 1 schematically illustrates a process for transmitting a beacon frame signal in an Ad-hoc network of a conventional IEEE 802.11 system.

Referring to FIG. 1, a beacon frame signal is transmitted every beacon interval. If a plurality of nodes transmit beacon frame signals at the same time, performance degradation may occur due to collision among the beacon frame signals.

An IEEE 802.11 system thus specifies that each node randomly transmits a beacon frame signal. Specifically, each node transmits a beacon frame signal based on, for example, a contention-based scheme. That is, each node waits during time corresponding to random delay, e.g., time D1 upon detecting that it reaches TBTT. Each node does not transmit a beacon frame signal if there is a beacon frame signal which is received during the time D1, and transmits a beacon frame signal if there is no beacon frame signal which is received during the time D1.

In FIG. 1, an STA#22 transmits a beacon frame signal in the first beacon interval, an STA#31 transmits a beacon frame signal in the second beacon interval, and an STA#15 transmits a beacon frame signal in the third beacon interval.

Like this, in an IEEE 802.11 system, each of a plurality of nodes may detect a neighbor node using beacon frame signals which the plurality of nodes transmit randomly and alternately.

In the Ad-hoc mode of the IEEE 802.11 system, all nodes acquire time synchronization using a beacon frame signal and operate corresponding to the acquired time synchronization. If a network including relatively many nodes is configured in a relatively large region, it is difficult for all nodes included in the network to acquire time synchronization.

As a result, in a wireless network in which time synchronization is not acquired, relatively much power is consumed for a related node to discover a neighbor node and detect whether a message will be transmitted to the related node.

A process for transmitting a beacon frame signal in an Ad-hoc network of a conventional IEEE 802.11 system has been described with reference to FIG. 1, and a process for transmitting a training symbol in an Ad-hoc network of a conventional IEEE 802.11 system will be described with reference to FIG. 2.

FIG. 2 schematically illustrates a process for transmitting a training symbol in an Ad-hoc network of a conventional IEEE 802.11 system.

Referring to FIG. 2, it will be noted that a process for transmitting a training symbol in FIG. 2 is a process for transmitting a training symbol in a case that a beacon frame signal includes 12 training symbols.

In the IEEE 802.11 system, a beacon frame includes a preamble field, and the preamble field includes 10 short training symbols and 2 long training symbols. During a time interval corresponding to the 10 short training symbols, each STA detects a signal, and performs an automatic gain control (AGC) operation and a coarse frequency offset estimating operation. During a time interval corresponding to the 2 long training symbols which are transmitted after the time interval corresponding to the 10 short training symbols, each STA performs a refinement frequency offset estimating operation and a channel estimating operation.

The beacon frame includes network information, time stamp, and the like as well as the preamble field.

Meanwhile, in a case that each node randomly transmits a beacon frame signal to acquire time synchronization of a network like in the IEEE 802.11 system, there are many advantages in a view of resource allocation and power management.

However, there may be a case that a direct connection between two nodes within a network is impossible since nodes are located at a relatively large coverage. In this case, it may be difficult for all nodes in the IEEE 802.11 system to acquire time synchronization, this results in increase of power consumption of each node. That is, time which each node operates a receiver for discovering a neighbor node and detecting whether a message is transmitted to each node becomes long.

Further, each node determines whether to randomly transmit a beacon frame signal. In the IEEE 802.11 system, if the number of nodes included in an Ad-hoc network is increased, a plurality of nodes transmit beacon frame signals at the same time, so collision among the beacon frame signals may occur. The collision among the beacon frame signals may make it difficult for the nodes included in the Ad-hoc network to stably receive a beacon frame signal, so this makes it difficult for the nodes to acquire time synchronization to decrease stability of a total system and to increase power consumption of the nodes.

However, the IEEE 802.11 system considers only a case that a relatively small number of nodes are located within a relatively short distance, so an Ad-hoc network which is implemented in the IEEE 802.11 system needs to be implemented as a short range network with a small scale.

Meanwhile, in the IEEE 802.11 system, each node randomly transmits a beacon frame signal to discover a neighbor node and measure channel status between each node and the neighbor node. However, if a service coverage of the Ad-hoc network is implemented as a relatively large service coverage, it is impossible for each node to perform a discovering operation and a channel status measuring operation for all neighbor nodes in the Ad-hoc network.

As described above, in the Ad-hoc network, each node determines whether to randomly transmit a beacon frame signal. If the number of nodes included in the Ad-hoc network of the IEEE 802.11 system is increased, the number of beacon frame transmitting opportunities which are given to each node is decreased. If the number of beacon frame transmitting opportunities which are given to each node is decreased, neighbor nodes which are located around a related node may not discover the related node. In this case, even though the neighbor nodes may discover the related node, the related node may not accurately measure channel status between the related node and the discovered neighbor node.

As such, the IEEE 802.11 system considers only a case that a relatively small number of nodes are located within a relatively short distance due to a case that a neighbor node discovering process and a channel status measuring process may not be normally performed, so an Ad-hoc network which is implemented in the IEEE 802.11 system needs to be implemented as a short range network which has a relatively small service coverage.

The above information is presented as background information only to assist with an understanding of the present disclosure. No determination has been made, and no assertion is made, as to whether any of the above might be applicable as prior art with regard to the present disclosure.

SUMMARY

An aspect of the present disclosure is to address at least the above-mentioned problems and/or disadvantages and to provide at least the advantages described below. Accordingly, an aspect of the present disclosure is to an apparatus and method for operating an Ad-hoc mode in a wireless communication network.

Another aspect of the present disclosure is to propose an apparatus and method for operating an Ad-hoc mode based on a power managing scheme in a wireless communication network.

Another aspect of the present disclosure is to propose an apparatus and method for operating an Ad-hoc mode based on a neighbor node discovering scheme in a wireless communication network.

Another aspect of the present disclosure is to propose an apparatus and method for operating an Ad-hoc mode thereby decreasing power which is consumed for discovering a neighbor node in a wireless communication network.

Another aspect of the present disclosure is to propose an apparatus and method for operating an Ad-hoc mode thereby decreasing power which is consumed for detecting whether there is a message which targets a related node in a wireless communication network.

Another aspect of the present disclosure is to propose an apparatus and method for operating an Ad-hoc mode thereby acquiring synchronization for transmission time among neighbor nodes in a wireless communication network.

Another aspect of the present disclosure is to propose an apparatus and method for operating an Ad-hoc mode by generating a plurality of sub-groups which have the same time synchronization in a wireless communication network.

Another aspect of the present disclosure is to propose an apparatus and method for operating an Ad-hoc mode thereby enabling to discover a neighbor node in a wireless communication network.

Another aspect of the present disclosure is to propose an apparatus and method for operating an Ad-hoc mode thereby decreasing power which each node consumes in a wireless communication network.

In accordance with an aspect of the present disclosure, a method for transmitting a beacon frame signal by a transmitting node in a wireless communication network is provided. The method includes transmitting a first type beacon frame signal; and transmitting a second type beacon frame signal after preset time from time at which the first type beacon frame signal is transmitted, wherein nodes other than the transmitting node are incapable of transmitting the first type beacon frame signal while the first type beacon frame signal is transmitted, and wherein the nodes other than the transmitting node are capable of transmitting the second type beacon frame signal while the second type beacon frame signal is transmitted.

In accordance with another aspect of the present disclosure, a method for receiving a beacon frame signal by a receiving node in a wireless communication network is provided. The method includes receiving a first type beacon frame signal from a transmitting node; and receiving a second type beacon frame signal after preset time from time at which the first type beacon frame signal is transmitted, wherein nodes other than the transmitting node are incapable of transmitting the first type beacon frame signal while the first type beacon frame signal is transmitted, and wherein the nodes other than the transmitting node are capable of transmitting the second type beacon frame signal while the second type beacon frame signal is transmitted.

In accordance with another aspect of the present disclosure, a transmitting node in a wireless communication network is provided. The transmitting node includes a transmitter configured to transmit a first type beacon frame signal, and transmit a second type beacon frame signal after preset time from time at which the first type beacon frame signal is transmitted, wherein nodes other than the transmitting node are incapable of transmitting the first type beacon frame signal while the first type beacon frame signal is transmitted, and wherein the nodes other than the transmitting node are capable of transmitting the second type beacon frame signal while the second type beacon frame signal is transmitted.

In accordance with another aspect of the present disclosure, a receiving node in a wireless communication network is provided. The receiving node includes a receiver configured to receive a first type beacon frame signal from a transmitting node, and receive a second type beacon frame signal after preset time from time at which the first type beacon frame signal is transmitted, wherein nodes other than the transmitting node are incapable of transmitting the first type beacon frame signal while the first type beacon frame signal is transmitted, and wherein the nodes other than the transmitting node are capable of transmitting the second type beacon frame signal while the second type beacon frame signal is transmitted.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain exemplary embodiments of the present disclosure will be more apparent from the following description taken in conjunction with the accompanying drawings, in which.

DETAILED DESCRIPTION

Figure 1:
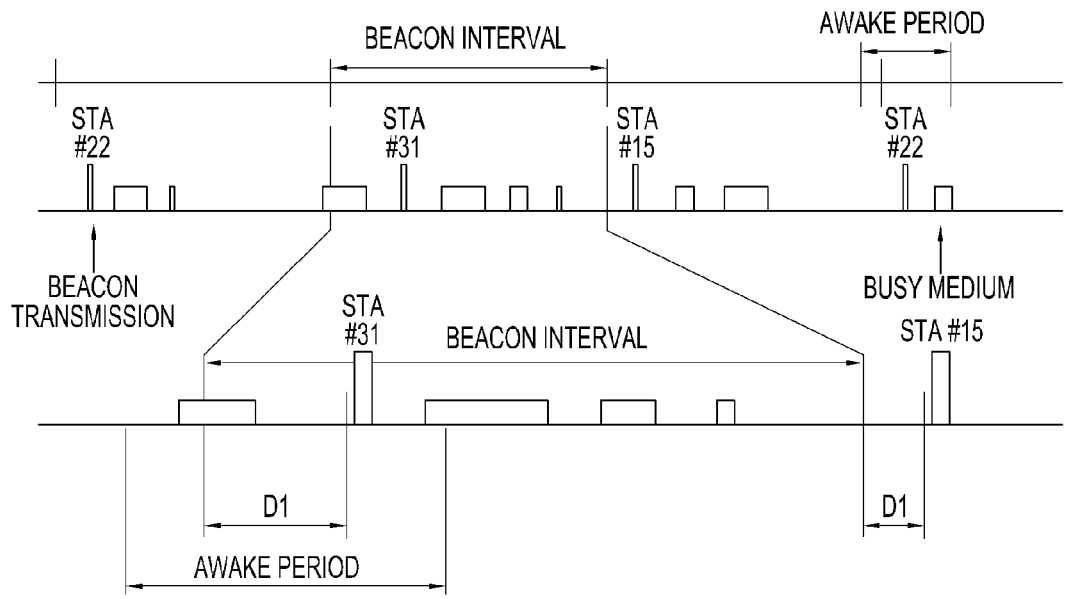
FIG. 1 schematically illustrates a process for transmitting a beacon frame signal in an Ad-hoc network of a conventional IEEE 802.11 system.
Figure 2:
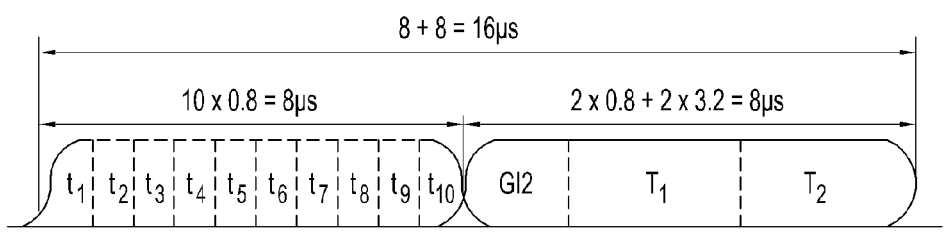
FIG. 2 schematically illustrates a process for transmitting a training symbol in an Ad-hoc network of a conventional IEEE 802.11 system.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, for example, a signal transmitting apparatus may be a node.

According to various embodiments of the present disclosure, for example, a signal receiving apparatus may be a node.

An embodiment of the present disclosure proposes an apparatus and method for operating an Ad-hoc mode in a wireless communication network.

An embodiment of the present disclosure proposes an apparatus and method for operating an Ad-hoc mode based on a power managing scheme in a wireless communication network.

An embodiment of the present disclosure proposes an apparatus and method for operating an Ad-hoc mode based on a neighbor node discovering scheme in a wireless communication network.

An embodiment of the present disclosure proposes an apparatus and method for operating an Ad-hoc mode thereby decreasing power which is consumed for discovering a neighbor node in a wireless communication network.

An embodiment of the present disclosure proposes an apparatus and method for operating an Ad-hoc mode thereby decreasing power which is consumed for detecting whether there is a message which targets a related node in a wireless communication network.

An embodiment of the present disclosure proposes an apparatus and method for operating an Ad-hoc mode thereby acquiring synchronization for transmission time among neighbor nodes in a wireless communication network.

An embodiment of the present disclosure proposes an apparatus and method for operating an Ad-hoc mode by generating a plurality of sub-groups which have the same time synchronization in a wireless communication network.

An embodiment of the present disclosure proposes an apparatus and method for operating an Ad-hoc mode thereby enabling to discover a neighbor node in a wireless communication network.

An embodiment of the present disclosure proposes an apparatus and method for operating an Ad-hoc mode thereby decreasing power which each node consumes in a wireless communication network.

A method and apparatus proposed in various embodiments of the present disclosure may be applied to various communication systems such as an institute of electrical and electronics engineers (IEEE) 802.11 communication system, an IEEE 802.16 communication system, a digital video broadcast system such as a mobile broadcast service such as a digital multimedia broadcasting (DMB) service, a digital video broadcasting-handheld (DVP-H), an advanced television systems committee-mobile/handheld (ATSC-M/H) service, and the like, and an internet protocol television (IPTV), a moving picture experts group (MPEG) media transport (MMT) system, an evolved packet system (EPS), a long term evolution (LTE) mobile communication system, an long term evolution-advanced (LTE-A) mobile communication system, a high speed downlink packet access (HSDPA) mobile communication system, a high speed uplink packet access (HSUPA) mobile communication system, a high rate Packet data (HRPD) mobile communication system proposed in a 3rd generation project partnership 2 (3GPP2), a wideband code division multiple access (WCDMA) mobile communication system proposed in the 3GPP2, a code division multiple access (CDMA) mobile communication system proposed in the 3GPP2, a mobile internet protocol (Mobile IP) system and/or the like.

If all of nodes included in a wireless network align time synchronization, all of the nodes may effectively operate in many aspects such as power, a data rate, and the like. However, in an actual environment of the wireless network, it may be difficult for all of the nodes included in the wireless network to align the time synchronization. Specially, if the wireless network is implemented thereby having a relatively large service coverage, it may be difficult for all of the nodes included in the wireless network to align time synchronization.

As such, an embodiment of the present disclosure proposes a scheme in which nodes included in a specific sub-group not all nodes included in a wireless network, e.g., an Ad-hoc network of an IEEE 802.11 system align time synchronization. Here, nodes included in the same sub-group have the same time synchronization. That is, a sub-group denotes a set of nodes which have the same time synchronization.

Firstly, one Ad-hoc network includes at least one sub-group. If the Ad-hoc network includes at least two sub-groups, each of the least two sub-groups may have different time synchronization, and nodes included in each sub-group are synchronized corresponding to time synchronization of a related sub-group.

Like this, in a case that time synchronization is aligned per sub-group in an Ad-hoc network, even though a service coverage of the Ad-hoc network is relatively large, that is, if the service coverage of the Ad-hoc network is larger than a preset threshold service coverage, a case that neighbor nodes locally align time synchronization is relatively easy compared to a case that all nodes included in the Ad-hoc network align time synchronization. Further, most communications which are performed in the Ad-hoc network are performed among neighbor nodes, so efficiency similar to efficiency in a case that all nodes included in the Ad-hoc network align time synchronization may be acquired.

Meanwhile, each node included in the Ad-hoc network may be included in at least one sub-group. A node which is included in different sub-groups at the same time acquires time synchronization for all of the different sub-groups, and may operate as a relay among the different sub-groups.

A process for acquiring time synchronization based on a local synchronization scheme in an Ad-hoc network of an IEEE 802.11 system according to an embodiment of the present disclosure will be described with reference to FIG. 3.

Figure 3:
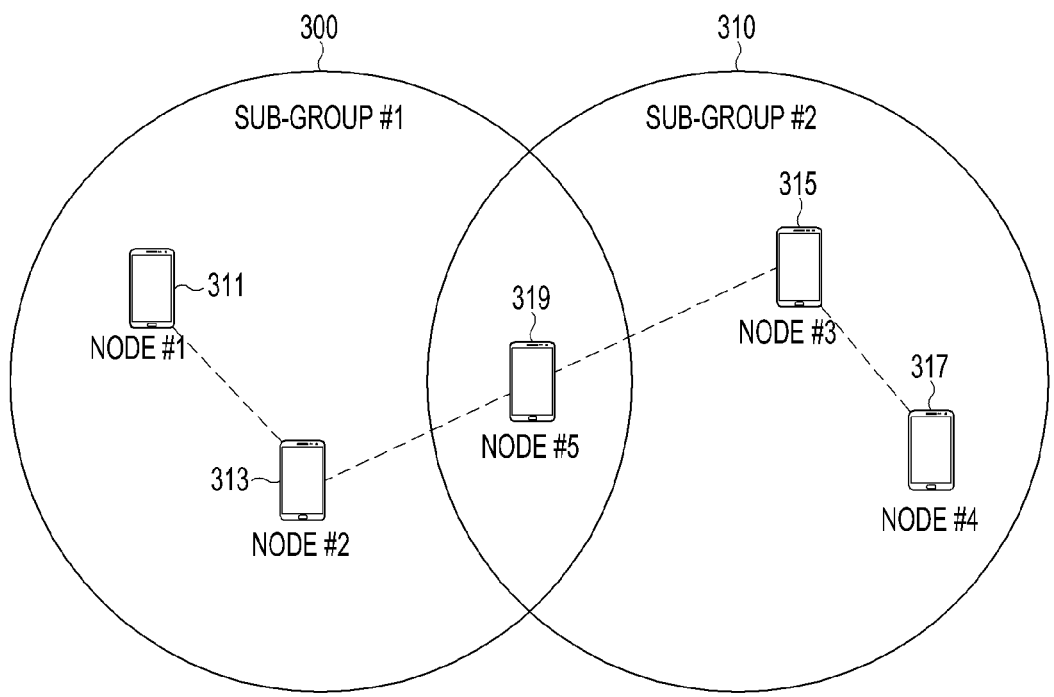
FIG. 3 schematically illustrates a process for acquiring time synchronization based on a local synchronization scheme in an Ad-hoc network of an IEEE 802.11 system according to an embodiment of the present disclosure.

FIG. 3 schematically illustrates a process for acquiring time synchronization based on a local synchronization scheme in an Ad-hoc network of an IEEE 802.11 system according to an embodiment of the present disclosure.

Referring to FIG. 3, the Ad-hoc network includes a plurality of nodes, e.g., five nodes, e.g., a node #1 311, a node #2 313, a node #3 315, a node #4 317, and a node #5 319. The node #1 311 and the node #2 313 are included in a sub-group #1 300, and the sub-group #1 300 has time synchronization time 1. The node #3 315 and the node #4 317 are included in a sub-group #2 310, and the sub-group #2 310 has time synchronization time 2. The node #5 319 is included in the sub-group #1 300 and the sub-group #2 310 at the same time, and may operate as a relay between the sub-group #1 300 and the sub-group #2 310.

As described in FIG. 3, if a local synchronization scheme as a scheme in which some neighbor nodes not all nodes included in an Ad-hoc network, i.e., nodes included in a sub-group align time synchronization is operated, power consumption for each of nodes included in the Ad-hoc network to acquire time synchronization may be decreased.

A process for acquiring time synchronization based on a local synchronization scheme in an Ad-hoc network of an IEEE 802.11 system according to an embodiment of the present disclosure has been described with reference to FIG. 3, and an operation for transmitting a beacon frame signal in an IEEE 802.11 system according to an embodiment of the present disclosure will be described below.

In an embodiment of the present disclosure, one node among nodes included in each sub-group transmits a beacon frame signal. Here, it will be assumed that a beacon frame has the same format as a beacon frame which is used in an IEEE 802.11 system.

Alternatively, each of nodes included in each sub-group may randomly transmit a beacon frame signal, or a leader node among nodes included in each sub-group may transmit a beacon frame signal.

For convenience, in an embodiment of the present disclosure, it will be assumed that there is a leader node in each sub-group in an IEEE 802.11 system, and the leader node of each sub-group transmits a beacon frame signal. However, it will be understood by those of ordinary skill in the art that an apparatus for transmitting a beacon frame signal may be other node as well as the leader node, and this will be commonly applied to all networks in which time synchronization among sub-groups are aligned based on a related beacon frame signal.

Meanwhile, in an IEEE 802.11 system according to an embodiment of the present disclosure, it will be assumed that each node operates in one of a sleep mode, an idle mode, a reception mode, and a transmission mode. Here, the transmission mode denotes a mode that data or a beacon frame signal is transmitted, and the reception mode denotes a mode that data is received. The sleep mode denotes a mode that a related node powers off units such as a transceiver, and the like included in the related node, and operates in order to decrease power consumption. The idle mode denotes a mode which is not the sleep mode, the transmission mode, and the reception mode.

In an embodiment of the present disclosure, one Ad-hoc network includes at least one sub-group. Nodes included in the at least one sub-group have the same time synchronization. If the Ad-hoc network includes a plurality of sub-groups, time synchronization of each of the plurality of sub-groups may be different.

Meanwhile, a beacon frame signal is transmitted every beacon interval for acquiring time synchronization of each sub-group. Each of nodes included in each sub-group receives a beacon frame signal transmitted in a related sub-group to acquire time synchronization for the related sub-group.

In an embodiment of the present disclosure, nodes which have a message to be transmitted within a preset time interval from time at which a beacon frame signal is transmitted transmit information indicating that there is a message to be transmitted. Even though a node does not transmit the beacon frame signal, the node may transmit a message within the preset time interval. The node which will transmit the message may transmit a node identifier (ID) of the node which will transmit the message within a preset time interval, e.g., time T1 from time at which transmission of the beacon frame signal is completed, a node ID of a node which will receive the message, and information indicating that there is message to be transmitted to indicate that there is the message to be transmitted. For convenience, the node which has the message to be transmitted will be referred to as 'transmission planning node'. As such, each node receives a beacon frame signal and needs to detect whether nodes other than each node will transmit a message.

As such, minimum time during which each node operates a receiver included in each node in order to receive one beacon frame signal becomes sum of time interval during the beacon frame signal is transmitted and the time interval $T_I$. That is, the beacon frame signal includes information on nodes which will transmit a message within preset time among nodes included in a related sub-group, so each node may acquire time synchronization for the related sub-group, measure channel status, and detect the nodes which will transmit the message within the preset time among the nodes included in the related sub-group even though receiving only the beacon frame signal. For convenience, information related to a node which will transmit a node within the preset time will be referred to as 'transmission planning node information'. That is, one beacon frame signal includes a beacon signal and transmission planning node information.

A process for transmitting transmission planning node information in an Ad-hoc network of an IEEE 802.11 system according to an embodiment of the present disclosure will be described with reference to FIG. 4.

Figure 4:
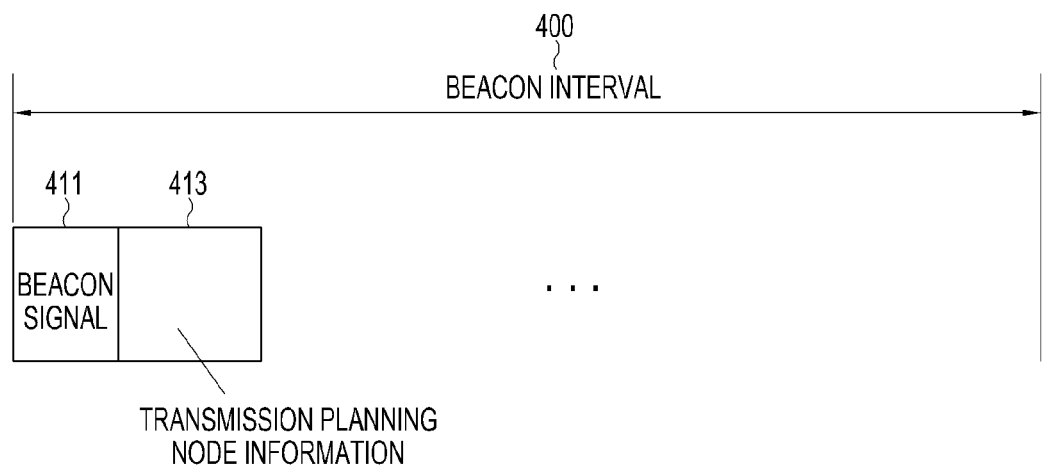
FIG. 4 schematically illustrates a process for transmitting transmission planning node information in an Ad-hoc network of an IEEE 802.11 system according to an embodiment of the present disclosure.

FIG. 4 schematically illustrates a process for transmitting transmission planning node information in an Ad-hoc network of an IEEE 802.11 system according to an embodiment of the present disclosure.

Referring to FIG. 4, a beacon signal 411 is transmitted every beacon frame within a beacon interval 400, and transmission planning node information 413 is transmitted within a time interval $T_I$ from time at which the transmission of the beacon signal 411 is completed. In FIG. 4, the transmission planning node information 413 is transmitted immediately after the transmission of the beacon signal 411 is completed.

The transmission planning node information 413 may include a node ID of a node which will transmit a message, i.e., a transmission planning node, a node ID of a node which will receive the message, i.e., a reception planning node, a message transmitting timing point at which the transmission planning node will actually transmit the message, time length, and the like.

For example, if a specific node detects that there is a message which will be transmitted to the specific node based on the transmission planning node information 413 after receiving the beacon signal 411, the specific node makes a receiver of the specific node to start operating at the message transmitting timing point included in the transmission planning node information 413 to receive the message.

Alternatively, if the specific node detects that there is no message which will be transmitted to the specific node based on the transmission planning node information 413 after receiving the beacon signal 411, the specific node maintains a sleep state until the next beacon signal is transmitted after transiting into the sleep state.

A process for transmitting transmission planning node information in an Ad-hoc network of an IEEE 802.11 system according to an embodiment of the present disclosure has been described with reference to FIG. 4, and a process for performing a scan operation in an IEEE 802.11 system according to an embodiment of the present disclosure will be described below.

In an embodiment of the present disclosure, each node maintains an on state of a receiver during relatively long time in order to discover a neighbor network of each node on initial power on. A process for discovering a neighbor network according to power on will be referred to as an 'initial scan process.' It will be assumed that time during which a node is on a wake-up state for performing the initial scan process is $T_{INIT}$. That is, the time $T_{INIT}$ denotes time during which the initial scan process is performed.

Firstly, a beacon frame signal which a node initially receives passes through a fading channel for which information may not be known by the node, so it is difficult for the node to normally receive the beacon frame signal. As such, in an IEEE 802.11 system, the $T_{INIT}$ is set to a time interval which is longer than a beacon interval. For example, the $T_{INIT}$ may be set to 2 or 5 seconds.

While performing the initial scan process, the node detects which nodes exist around the node and each of the nodes which exist around the node, i.e., neighbor nodes is includes in which sub-group by continuously discovering a beacon frame signal or a pilot signal which a neighbor node transmits while the node does not any signal. That is, the initial scan process is a process in which the node operates on a wakeup state during $T_{INIT}$ in order to detect a neighbor environment of the node after the node is initially included in a network.

Like this, power which is consumed while the initial scan process is performed is generally smaller than total consumed power of the node thereby the power which is consumed while the initial scan process is performed may be ignored. If the node discovers neighbor nodes through the initial scan process, the node is included in a sub-group by accessing the sub-group in which a neighbor node of which channel status is the best among the discovered neighbor nodes is included.

If the node does not discover any neighbor nodes through the initial scan process, the node generates a sub-group, and may transmit a beacon signal as a leader of the generated sub-group.

If the node is included in a specific sub-group through the initial scan process, a state from a timing point at which the node is included in the specific sub-group to a timing point at which the node performs an actual data communication will be defined as 'reception standby state'. The reception standby state will be described below.

Firstly, a node may differently operate according that the node communicates with which number of sub-groups, that is, the node is included in which number of sub-groups. For example, if the node is included in one sub-group, the node has the same time synchronization with all nodes included in the sub-group, so the node may transmit transmission planning node information at a predetermined timing point. As such, the nodes included in the sub-group receive the transmission planning node information only at the predetermined timing point.

Alternatively, if the node is located at a boundary region between two sub-groups, the node may receive a message from each of nodes included in the two sub-groups. That is, if the node is included in the two sub-groups, the node needs to receive transmission planning node information for each of the two sub-groups at two different timing points.

There is a need for increasing the number of times that a receiver of a related node is turned on in order for the related node to receive transmission planning node information according that the related node is included in which number of sub-groups.

Further, the node performs a full scan process for neighbor nodes by preset time period in order to detect that a neighbor node is changed according to mobility of nodes and change of a channel environment at the same time along with the initial scan process. The full scan process is performed for discovering a neighbor node, and a time interval during which the full scan process is performed needs to be longer than a beacon interval for discovering all neighbor nodes through one full scan process. For convenience, the time interval during the full scan process is performed will be referred to as 'full scan process interval'.

As such, power consumption of a node which is on a reception standby state includes power consumption of a receiver for receiving transmission planning node information and receiving a beacon signal of a sub-group in which the node is included in and power consumption of the receiver for full scanning a neighbor node. A period by which the full scan process in performed is generally longer than a period by which a receiver is operated for receiving a beacon signal and transmission planning node information.

An operating process of a node which is on a reception standby state in an Ad-hoc network of an IEEE 802.11 system according to an embodiment of the present disclosure will be described with reference to FIG. 5.

Figure 5:
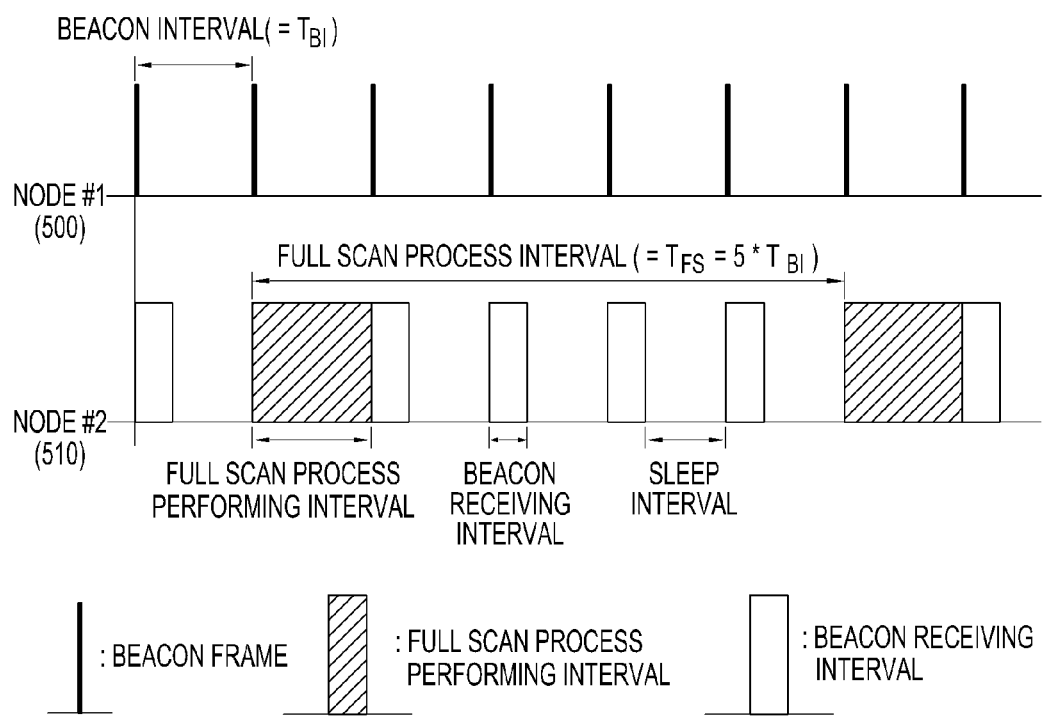
FIG. 5 schematically illustrates an operating process of a node which is on a reception standby state in an Ad-hoc network of an IEEE 802.11 system according to an embodiment of the present disclosure.

FIG. 5 schematically illustrates an operating process of a node which is on a reception standby state in an Ad-hoc network of an IEEE 802.11 system according to an embodiment of the present disclosure.

Referring to FIG. 5, it will be noted that an operating process of a node which is on a reception standby state is an operating process of a node which is included in one sub-group and is on a reception standby state.

Firstly, each node performs a full scan process for discovering a neighbor node by a preset period. FIG. 5 illustrates an operation of a receiver of a node in a case that a full scan process is performed every five beacon intervals.

It will be assumed that a node #1 500 is a leader node of a sub-group which periodically transmits a beacon frame signal. The node #1 500 transmits a beacon signal every beacon interval $T_{BI}$. The node #1 500 may transmit transmission planning node information within preset time, e.g., $T_I$ from a timing point at which the transmission of the beacon signal is completed. The reason why the node #1 500 transmits the transmission planning node information within the $T_I$ from the timing point at which the transmission of the beacon signal is completed is for decreasing power consumption of a node which receives the transmission planning node information. For example, the transmission planning node information may be included in a beacon frame through which the beacon signal is transmitted as a message.

A node #2 510 is a node which receives the beacon frame signal which the node #1 500 transmits. The node #2 510 may receive a beacon frame signal every beacon interval to acquire time synchronization based on a beacon signal included in the beacon frame signal and determine whether there is a message to be transmitted to the node #2 510 based on the transmission planning node information. If there is no message to be transmitted to the node #2 510, the node #2 510 receives a beacon frame signal during the beacon interval, and transits into a sleep state to minimize power consumption during remaining time interval other than time interval during the node #2 510 receives the beacon frame signal.

The node #2 510 discovers a neighbor node every a full scan process interval. For example, the full scan process interval may be set to an integer multiple of the beacon interval, the node #2 510 discovers neighbor nodes during time which is equal to or longer than a beacon interval every the full scan process interval to determine whether there is a new neighbor node. As such, total power consumption of the node #2 510 includes power consumption for receiving a beacon frame signal which the node #1 500 transmits every beacon interval and power consumption for discovering whether there is a new neighbor node every full scan process interval.

The node #2 510 transits into a sleep state during a remaining time interval except for a time interval during which the node #2 510 receives the beacon signal and the transmission planning node information, and determines the new neighbor node to minimize power consumption.

In an embodiment of the present disclosure, each node may operate a receiver in order to receive a beacon signal and transmission planning node information and discover a neighbor node, and operate on a sleep state during remaining time interval to minimize power consumption.

An operating process of a node which is on a reception standby state in an Ad-hoc network of an IEEE 802.11 system according to an embodiment of the present disclosure has been described with reference to FIG. 5, and an example of a process for transmitting and receiving a beacon frame signal in a node which is on a reception standby state in an Ad-hoc network of an IEEE 802.11 system according to an embodiment of the present disclosure will be described with reference to FIG. 6.

Figure 6:
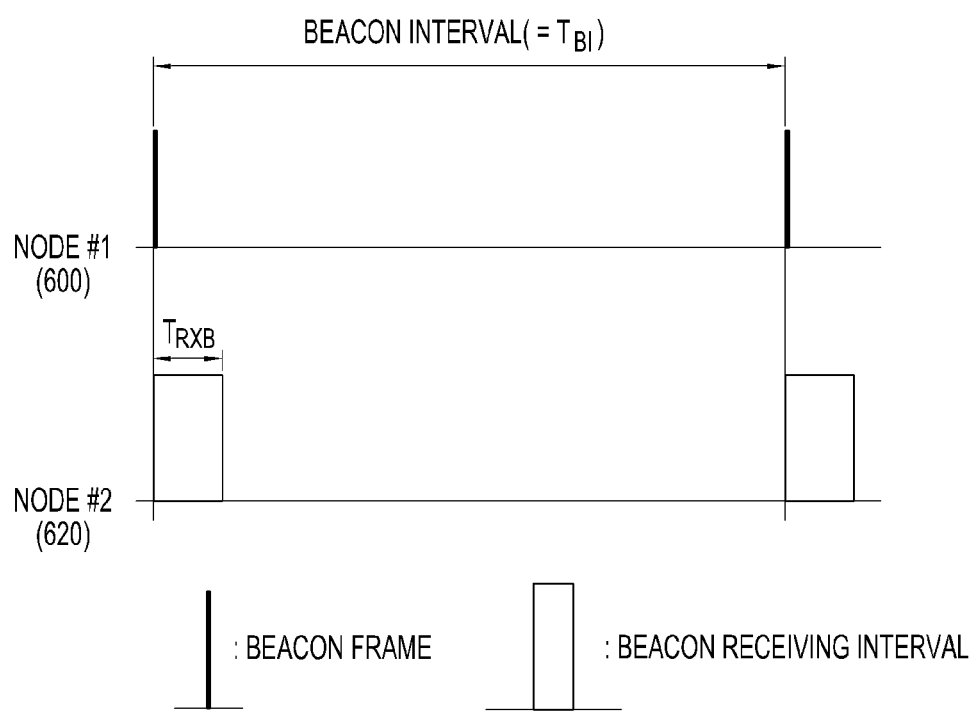
FIG. 6 schematically illustrates an example of a process for transmitting and receiving a beacon frame signal in a node which is on a reception standby state in an Ad-hoc network of an IEEE 802.11 system according to an embodiment of the present disclosure.

FIG. 6 schematically illustrates an example of a process for transmitting and receiving a beacon frame signal in a node which is on a reception standby state in an Ad-hoc network of an IEEE 802.11 system according to an embodiment of the present disclosure.

Referring to FIG. 6, it will be noted that a process for transmitting and receiving a beacon frame signal in a node which is on a reception standby state in FIG. 6 is a process for transmitting and receiving a beacon frame signal in a node which is on a reception standby state in a case that one node is included in one sub-group.

It will be assumed that a node #1 600 is a leader node of a related sub-group. The node #1 600 periodically transmits a beacon frame signal. The node #1 600 transmits a beacon frame signal every beacon interval $T_{BI}$.

A node #2 610 knows a period by which a beacon frame signal is transmitted previously, and operates a receiver at a timing point at which the beacon frame signal is transmitted to receive a beacon signal. The node #2 610 receives transmission planning node information as well as the beacon signal to determine whether there is a message to be transmitted to the node #2 610. A time interval during which the node #2 610 operates a receiver for receiving a beacon frame signal is $T_{RXB}$. The node #2 610 performs a full scan process corresponding to a preset full scan process interval, and a process of performing the full scan process is not illustrated in FIG. 6.

A process of transmitting and receiving a beacon frame signal by a node which is on a reception standby state in a case that one node is included in one sub-group in an Ad-hoc network of an IEEE 802.11 system according to an embodiment of the present disclosure has been described in FIG. 6.

Alternatively, one node is located at a boundary region between two sub-groups, so the node may receive a beacon frame signal of each of the two sub-groups. That is, the node is included in each of the two sub-groups, so the node may receive transmission planning node information as well as the beacon signal which is transmitted by each of the two sub-groups.

A process for transmitting and receiving a beacon frame signal in a node which is on a receiving standby state and included in two sub-groups in an Ad-hoc network of an IEEE 802.11 system according to an embodiment of the present disclosure will be described with reference to FIG. 7.

Figure 7:
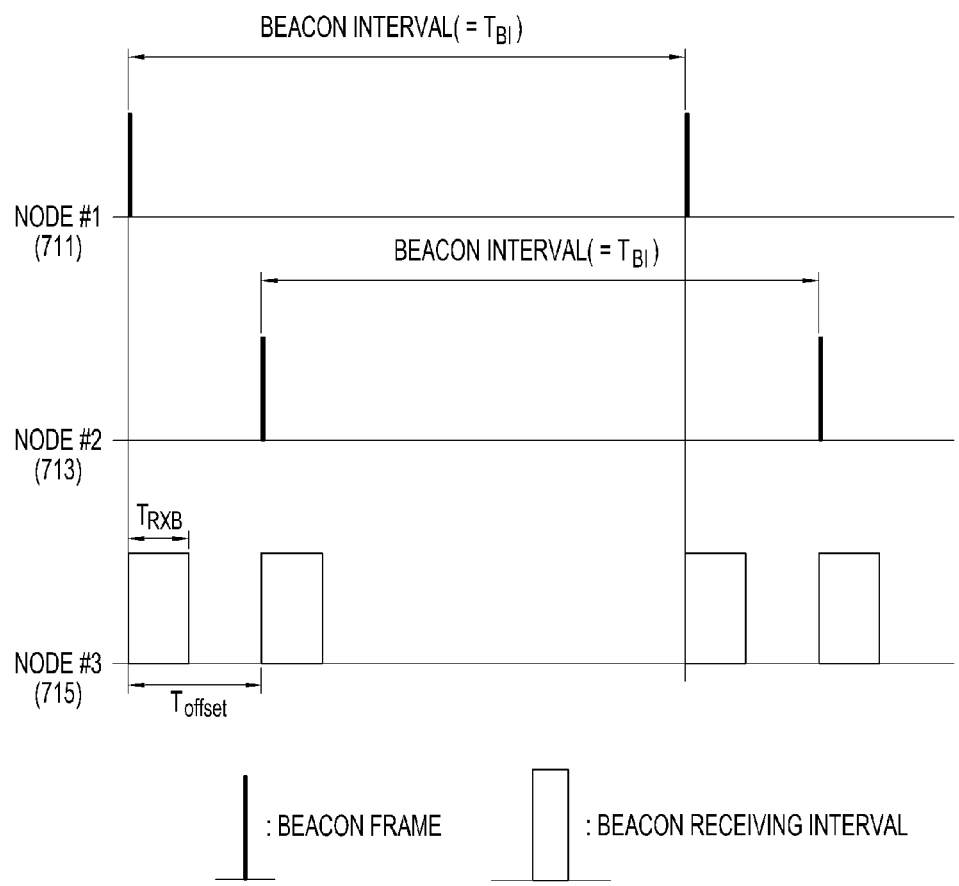
FIG. 7 schematically illustrates a process for transmitting and receiving a beacon frame signal in a node which is on a receiving standby state and included in two sub-groups in an Ad-hoc network in an IEEE 802.11 system according to an embodiment of the present disclosure.

FIG. 7 schematically illustrates a process for transmitting and receiving a beacon frame signal in a node which is on a receiving standby state and included in two sub-groups in an Ad-hoc network in an IEEE 802.11 system according to an embodiment of the present disclosure.

Referring to FIG. 7, it will be noted that a process for transmitting and receiving a beacon frame signal in a node which is on a reception standby state in FIG. 7 is a process for transmitting and receiving a beacon frame signal in a node which is on a reception standby state in a case that one node is included in two sub-groups. In FIG. 7, the node is included in the two sub-groups. However, even though the node is included in three or more than three sub-groups, the node may transmit and receive a beacon frame signal with a manner similar to a manner described in FIG. 7.

Firstly, it will be assumed that a node #1 711 is a leader node of a sub-group #1, and a node #2 713 is a leader node of a sub-group #2. It will be assumed that a node #3 715 is located at a boundary region between the sub-group #1 and the sub-group #2, and is included in all of the sub-group #1 and the sub-group #2.

As such, the node #3 715 receives two beacon frame signals during a beacon interval. That is, the node #3 715 receives a beacon frame signal which the node #1 711 as the leader node of the sub-group #1 transmits and a beacon frame signal which the node #2 713 as the leader node of the sub-group #2 transmits. The node #3 715 acquires time synchronization for each of the sub-group #1 and the sub-group #2.

As described in FIG. 6, a node included in one sub-group receives a beacon frame signal which a leader node of a related sub-group transmits, however, the node #3 715 has two beacon receiving intervals in order to acquire time synchronization for each of the sub-group #1 and the sub-group #2.

As described in FIG. 7, it will be understood that the node #1 711 transmits the beacon frame signal for the sub-group#1, the node #2 713 transmits the beacon frame signal for the sub-group #2, and there is difference $T_{offset}$ between a timing point at which the node #1 711 transmits the beacon frame signal for the sub-group#1 and a timing point at which the node #2 713 transmits the beacon frame signal for the sub-group#2.

As such, the node #3 715 receives the beacon frame signal which the node #2 713 transmits after time difference $T_{offset}$ after receiving the beacon frame signal which the node #1 711 transmits. As such, it will be understood that a node which is included in two sub-groups consumes relatively much power compared to a node which is included in one sub-group.

Meanwhile, the node #3 715 performs a full scan process corresponding to a preset full scan process interval, and a process for performing the full scan process is not illustrated in FIG. 7. The full scan process performed in the node #3 715 is similar to a full scan process descried in FIG. 5. That is, the node #3 715 performs a full scan process every preset full scan process interval. In this case, an interval during which one full scan process is performed may be set thereby the interval includes one beacon interval.

Further, a period by which a full scan process is performed may be set to network file system (NFS) X beacon interval. The NFS is a predetermined value. For example, the NFS may be an integer which is equal to or greater than 1. The larger the NFS becomes, the less power consumption of a node becomes. Alternatively, the less the NFS becomes, the greater the power consumption of the node becomes. In this case, discovery for a neighbor node may be completed within a relatively short time.

Meanwhile, an embodiment of the present disclosure proposes a new beacon frame structure for enabling fast neighbor node discovery, and this will be described below.

Firstly, a beacon frame signal which is used in a conventional IEEE 802.11 system is transmitted by only one node. As such, in a network of which a service coverage is relatively large, it may be difficult for a specific node to discover a neighbor node.

As such, an embodiment of the present disclosure proposes a new beacon frame structure for enabling to fast discover a neighbor node, a beacon frame for this fast neighbor node discovery will be referred to as 'Type B beacon frame'. The Type B beacon frame is designed thereby a plurality of nodes may transmit a Type B beacon frame signal at the same time, so it makes it easy to discover a neighbor node in a network of which a service coverage is relatively large. For convenience, a beacon frame which is used in a conventional IEEE 802.11 system will be referred to as 'Type A beacon frame'. Further, the Type B beacon frame signal is transmitted by the plurality of nodes at the same time, so it needs to make it possible to transmit the Type B beacon frame signal using a multiple access scheme.

Meanwhile, a Type A beacon frame signal and a Type B beacon frame signal are transmitted every beacon interval, and a process for transmitting a Type A beacon frame signal and a Type B beacon frame signal in an Ad-hoc network of an IEEE 802.11 system according to an embodiment of the present disclosure will be described with reference to FIG. 8.

Figure 8:
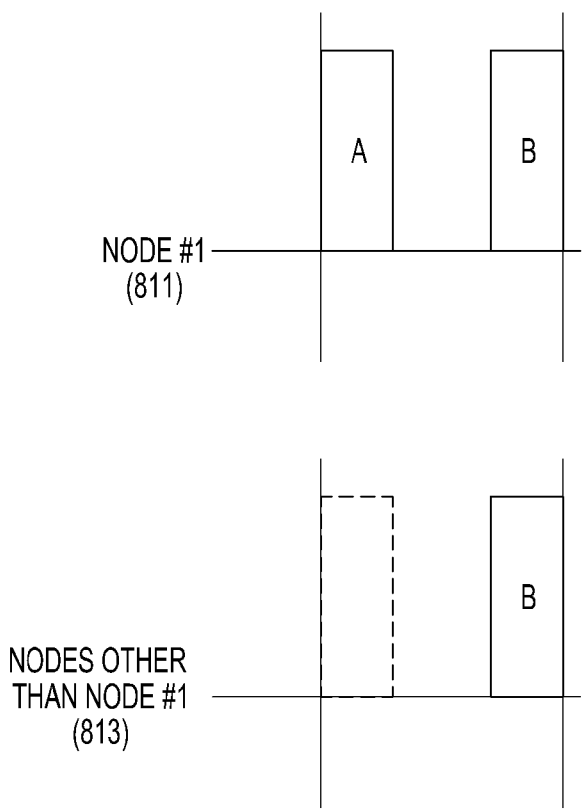
FIG. 8 schematically illustrates a process for transmitting a Type A beacon frame signal and a Type B beacon frame signal in an Ad-hoc network of an IEEE 802.11 system according to an embodiment of the present disclosure.

FIG. 8 schematically illustrates a process for transmitting a Type A beacon frame signal and a Type B beacon frame signal in an Ad-hoc network of an IEEE 802.11 system according to an embodiment of the present disclosure.

Referring to FIG. 8, for convenience, a Type A beacon frame signal is illustrated as 'A' and a Type B beacon frame signal is illustrated as 'B' in FIG. 8. In FIG. 8, it will be assumed that a node which transmits the Type A beacon frame signal is a node #1 811.

A Type A beacon frame is identical to a beacon frame which is currently used in a general IEEE 802.11 system, so a node which is randomly selected from a sub-group may transmit a Type A beacon frame signal, or a leader node of the sub-group may transmit a Type A beacon frame signal. Other nodes which receive the Type A beacon frame signal may acquire time synchronization by receiving the Type A beacon frame signal. That is, in FIG. 8, the node #811 is a node which transmits a Type A beacon frame signal.

The node #811 and nodes other than the node #811 may transmit a Type B beacon frame signal at a timing point which is different from a timing point at which the Type A beacon frame signal is transmitted. The Type B beacon frame signal may be transmitted based on a CDMA scheme in a plurality of nodes.

Meanwhile, it is well known that effect same as effect of the CDMA scheme may be achieved if each node transmits and receives a signal using different codes or sequences even though a modulation scheme such as an orthogonal frequency division multiplexing (OFDM) scheme is used like in the IEEE 802.11 system. As such, the use of the CDMA scheme may be commonly applied to all communication schemes which identify nodes using various codes or sequences regardless of a modulation scheme. Specially, a plurality of nodes transmit the same Type B beacon frame signal, so the Type B beacon frame signal enables fast discovery for may neighbor nodes in a relatively large service coverage compared to the Type A beacon frame signal.

If Type B beacon frame signal is transmitted immediately after the Type A beacon frame signal is transmitted, the Type A beacon frame signal and the Type B beacon frame signal may act as interference to each other. For example, if delay occurs in transmitting the Type A beacon frame signal, some nodes start transmitting the Type A beacon frame signal already, so the some node may not receive the Type A beacon frame signal.

As such, an embodiment of the present disclosure sets a guard interval for preventing the Type A beacon frame signal and the Type B beacon frame signal from acting as an interference signal to each other. As illustrated in FIG. 8, there is a time interval between the Type A beacon frame signal and the Type B beacon frame signal, and it will be understood that the time interval becomes the guard interval.

The node #811 transmits a Type A beacon frame signal. The node #811 may transmit a Type B beacon frame signal.

Alternatively, the node #811 transmits the Type A beacon frame signal, and does not transmit the Type B beacon frame signal. The reason why the node #811 transmits the Type A beacon frame signal, and does not transmit the Type B beacon frame signal is that neighbor nodes of the node #811 may discover the node #811 and measure channel status among the neighbor nodes and the node #811 using the Type A beacon frame signal.

However, in a case that it is difficult for the neighbor nodes of the node #811 to discover the node #811, or to measure the channel status among the neighbor nodes and the node #811 using the Type A beacon frame signal, the node #811 may transmit the Type B beacon frame signal after preset time from a timing point at which the transmission of the Type A beacon frame signal has been completed.

Nodes 813 other than the node #1 811 transmit the Type B beacon frame signal thereby neighbor nodes may discover a related node.

Meanwhile, the guard interval may be set by considering accuracy of a frequency oscillator and mobility of each node.

A process for transmitting a Type A beacon frame signal and a Type B beacon frame signal in an Ad-hoc network of an IEEE 802.11 system according to an embodiment of the present disclosure has been described with reference to FIG. 8, and a process for transmitting a Type A beacon frame signal, a Type B beacon frame signal, and a Type C beacon frame signal in an Ad-hoc network of an IEEE 802.11 system according to an embodiment of the present disclosure will be described with reference to FIG. 9.

Figure 9:
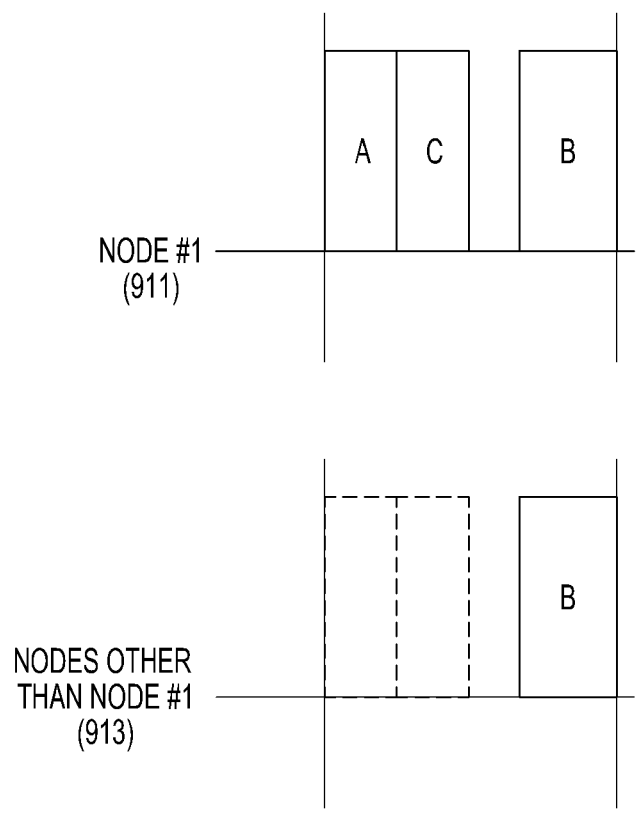
FIG. 9 schematically illustrates a process for transmitting a Type A beacon frame signal, a Type B beacon frame signal, and a Type C beacon frame signal in an Ad-hoc network of an IEEE 802.11 system according to an embodiment of the present disclosure.

FIG. 9 schematically illustrates a process for transmitting a Type A beacon frame signal, a Type B beacon frame signal, and a Type C beacon frame signal in an Ad-hoc network of an IEEE 802.11 system according to an embodiment of the present disclosure.

Referring to FIG. 9, a node which transmits a Type A beacon frame signal, i.e., a node #1 911 transmits a Type C beacon frame signal at time which is different from time at which the node #1 911 transmits the Type A beacon frame signal. The Type C beacon frame signal may be a preset sequence such as a preamble, or a message including system information which is transmitted after a beacon frame signal in an IEEE 802.11 system. That is, the Type C beacon frame signal may be system information including various information such as a network ID, a sub-group ID, time information, transmission planning node information, and the like.

In FIG. 9, node #1 911 transmits a Type C beacon frame signal immediately after completing the transmission of the Type A beacon frame signal. That is, the Type C beacon frame signal may be implemented as a form of broadcast message including system information, and the like, or a form of beacon signal such as a preamble. As a result, it will be noted that a term 'beacon' used in an embodiment of the present disclosure is not limited to a transmitting scheme thereof.

Meanwhile, transmission of a Type B beacon frame in FIG. 9 is performed in the manner described with reference to FIG. 8, and a description thereof will be omitted herein.

The reason why a Type B beacon frame signal is not transmitted immediately after transmission of a Type C beacon frame signal is completed is that the Type C beacon frame signal and the Type B beacon frame signal may be act as interference to each other. For example, if delay occurs in transmission of the Type C beacon frame signal, some nodes may start transmitting the Type B beacon frame signal already, so the some nodes may not receive the Type C beacon frame signal if the some nodes start transmitting the Type B beacon frame signal already.

Alternatively, the Type A beacon frame signal and a Type C beacon frame signal are transmitted by the same node, i.e., the node #1 911, so the Type A beacon frame signal and the Type C beacon frame signal do not act as interference to each other. If the Type A beacon frame signal and the Type C beacon frame signal are sequentially transmitted, a guard interval for preventing interference may be decreased. As such, in an embodiment of the present disclosure, the Type C beacon frame signal is concatenated with the Type A beacon frame signal and transmitted.

A process for transmitting a Type A beacon frame signal, a Type B beacon frame signal, and a Type C beacon frame signal in an Ad-hoc network of an IEEE 802.11 system according to an embodiment of the present disclosure has been described with reference to FIG. 9, and an example of relation among a Type A beacon frame, a Type B beacon frame, a Type C beacon frame, and slots in an Ad-hoc network of an IEEE 802.11 system according to an embodiment of the present disclosure will be described with reference to FIG. 10.

Figure 10:
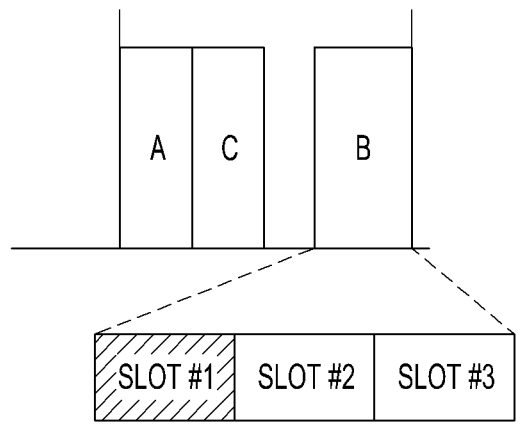
FIG. 10 schematically illustrates an example of relation among a Type A beacon frame, a Type B beacon frame, a Type C beacon frame, and slots in an Ad-hoc network of an IEEE 802.11 system according to an embodiment of the present disclosure.

FIG. 10 schematically illustrates an example of relation among a Type A beacon frame, a Type B beacon frame, a Type C beacon frame, and slots in an Ad-hoc network of an IEEE 802.11 system according to an embodiment of the present disclosure.

Referring to FIG. 10, related nodes divide a beacon interval into at least one slot to transmit a beacon frame signal. That is, the related nodes divide the beacon interval into a plurality of slots, e.g., $N_B$ slots to transmit a Type B beacon frame signal through one slot among the $N_B$ slots.

Relation among a Type A beacon frame, a Type B beacon frame, a Type C beacon frame, and slots in a case that the $N_B$ is 3 ($N_B$=3) is illustrated in FIG. 10.

In a case that each node transmits a Type B beacon frame signal, each node selects one of three slots to transmit the Type B beacon frame signal, and receives a beacon frame signal which neighbor nodes transmit during remaining interval.

Meanwhile, the $N_B$ may be set to 1 ($N_B$=1). If the $N_B$ is set to 1, it means that one slot is allocated for a Type B beacon frame every beacon interval. In this case, all nodes may transmit a Type B beacon frame signal in one slot. In this case, as described above, an operation of transmitting and receiving a beacon frame signal needs to be performed at the same time.

As such, in an IEEE 802.11 system according to an embodiment of the present disclosure, a Type B beacon frame signal may be transmitted every M beacon intervals not every beacon interval. That is, after a period by which the Type B beacon frame signal is transmitted is set to an integer multiple of a beacon interval, the Type B beacon frame signal is transmitted corresponding to the beacon interval.

Like this, in a case that the Type B beacon frame signal is transmitted every M beacon intervals, time which is consumed for discovering a neighbor node may becomes long, however, interference among the nodes may be decreased and a resource which is used for transmitting the Type B beacon frame signal may be decreased if the number of nodes included in a related Ad-hoc network is increased. The operation for transmitting the Type B beacon frame signal every M beacon intervals may be applied to a case that the $N_B$ is set to a value which is equal to or greater than 2.

An example of relation among a Type A beacon frame, a Type B beacon frame, a Type C beacon frame, and slots in an Ad-hoc network of an IEEE 802.11 system according to an embodiment of the present disclosure has been described with reference to FIG. 10, and another example of relation among a Type A beacon frame, a Type B beacon frame, a Type C beacon frame, and slots in an Ad-hoc network of an IEEE 802.11 system according to an embodiment of the present disclosure will be described with reference to FIG. 11.

Figure 11:
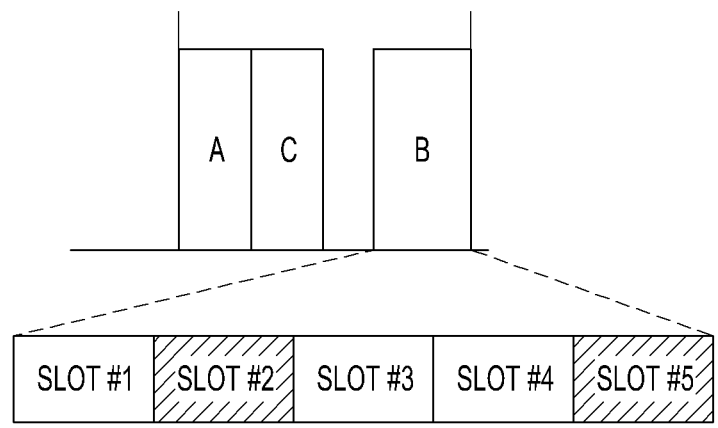
FIG. 11 schematically illustrates another example of relation among a Type A beacon frame, a Type B beacon frame, a Type C beacon frame, and slots in an Ad-hoc network of an IEEE 802.11 system according to an embodiment of the present disclosure.

FIG. 11 schematically illustrates another example of relation among a Type A beacon frame, a Type B beacon frame, a Type C beacon frame, and slots in an Ad-hoc network of an IEEE 802.11 system according to an embodiment of the present disclosure.

Referring to FIG. 11, as described in FIG. 10, a Type B beacon frame signal may be transmitted based on a plurality of slots. An operation for transmitting a Type B beacon frame signal in a case that $N_B$ is set to 5 is illustrated in FIG. 11.

In FIG. 10, a Type B beacon frame signal is transmitted through one of a plurality of slots. However, in FIG. 11, a Type B beacon frame signal may be transmitted through a plurality of slots among all slots included in a beacon interval. That is, in FIG. 11, $N_B$ is set to 5, that is, a beacon interval includes 5 slots, and 2 slots of the 5 slots are used for transmitting a Type B beacon frame signal.

A scheme for transmitting a Type B beacon frame signal through a plurality of slots among all slots included in a beacon interval as described in FIG. 11 may be implemented with various schemes, and this will be described below.

In the first scheme, a related node transmits a Type B beacon frame signal through a predetermined number of slots every beacon interval.

In the second scheme, a related node changes the number of slots through which a Type B beacon frame signal is transmitted, and transmits the Type B beacon frame signal corresponding to the changed number of slots. The number of slots through which the Type B beacon frame signal is transmitted may be determined as a random value. Alternately, the number of slots through which the Type B beacon frame signal is transmitted may be determined based on a specific probability. The specific probability may be determined based on a predetermined pseudo-random sequence. Here, initialization for the pseudo-random sequence may be performed based on each node ID.

Another example of relation among a Type A beacon frame, a Type B beacon frame, a Type C beacon frame, and slots in an Ad-hoc network of an IEEE 802.11 system according to an embodiment of the present disclosure has been described with reference to FIG. 11, and an example of a structure of a node in an Ad-hoc network of an IEEE 802.11 system according to an embodiment of the present disclosure will be described with reference to FIG. 12.

Figure 12:
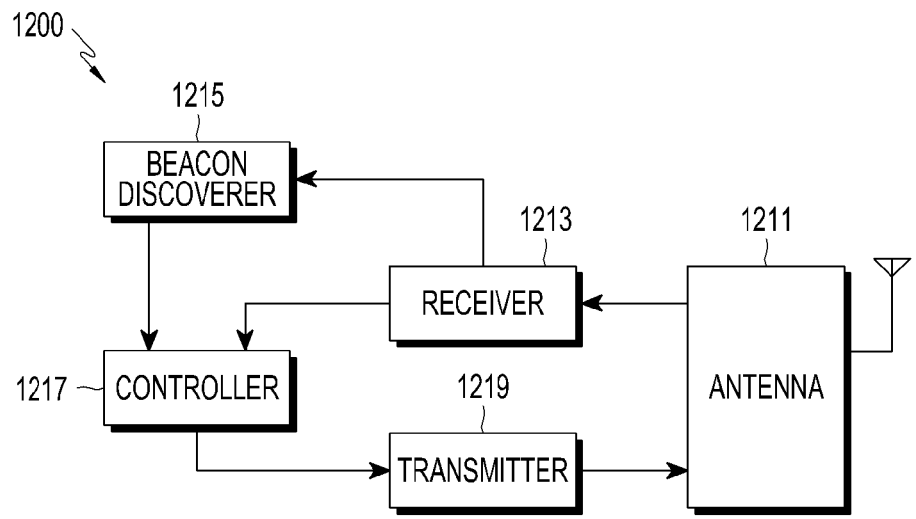
FIG. 12 schematically illustrates an example of a structure of a node in an Ad-hoc network of an IEEE 802.11 system according to an embodiment of the present disclosure.

FIG. 12 schematically illustrates an example of a structure of a node 1200 in an Ad-hoc network of an IEEE 802.11 system according to an embodiment of the present disclosure.

Referring to FIG. 12, the node 1200 includes an antenna 1211, a receiver 1213, a beacon discoverer 1215, a controller 1217, and a transmitter 1219.

The antenna 1211 receives a signal through a wireless channel, or transmits a signal through a wireless channel.

The receiver 1213 recovers data from a signal output from the antenna 1211. For example, the receiver 1213 may include a radio frequency (RF) receiving unit (not shown), a demodulating unit (not shown), a channel decoding unit (not shown), and the like. The RF receiving unit may include a filter (not shown), an RF pre-processor (not shown), and the like. If the node 1200 uses an OFDM scheme as a modulation scheme, the demodulating unit may include a fast Fourier transform (FFT) operator (not shown) for extracting data which is carried on each sub-carrier, and the like. The channel decoding unit may include a demodulator (not shown), a de-interleaver (not shown), a channel decoder (not shown), and the like.

The beacon discoverer 1215 discovers a beacon frame signal which a neighbor node transmits based on the signal transmitted from the receiver 1213, and acquires time synchronization based on the discovered beacon frame signal. If the node 1200 is included in a plurality of sub-groups, the node 1200 may operate the beacon discoverer 1215 several times to perform a discovering operation for a beacon frame signal which is transmitted per sub-group. In this case, the receiver 1213 needs to be operated during every interval for performing a beacon discovering operation.

The controller 1217 controls the overall operation of the node 1200. The controller 1217 discovers a beacon frame signal by operating the receiver 1213 and the beacon discoverer 1215 at a timing point at which the receiver 1213 needs to discover a beacon frame signal of a neighbor node. The controller 1217 may detect whether there is a message to be transmitted to the node based on transmission planning node information. If the node 1200 is included in a plurality of sub-groups, the controller 1217 controls the receiver 1213 and the beacon discoverer 1215 to discover a beacon frame signal by operating the receiver 1213 and the beacon discoverer 1215 several times during one beacon interval.

The transmitter 1219 generates a signal which will carry a beacon frame signal and data under a control of the controller 1217. That is, the transmitter 1219 performs an operation for transmitting a beacon frame signal, and transmits the beacon frame signal through the antenna 1211 under a control of the controller 1217. For example, the transmitter 1219 may include a signal generating unit (not shown), a channel coding unit (not shown), a modulation unit (not shown), an RF transmitting unit (not shown), and the like. The channel coding unit may include a modulator (not shown), an interleaver (not shown), a channel encoder (not shown), and the like. If the node 1200 uses an OFDM scheme, the modulation unit may include an inverse fast Fourier transform (IFFT) operator (not shown) for mapping data to a sub-carrier, and the like. The RF transmitting unit may include a filter (not shown), an RF pre-processor (not shown), and the like.

While the antenna 1211, the receiver 1213, the beacon discoverer 1215, the controller 1217, and the transmitter 1219 are described in the node as separate units, it is to be understood that this is merely for convenience of description. In other words, two or more of the antenna 1211, the receiver 1213, the beacon discoverer 1215, the controller 1217, and the transmitter 1219 may be incorporated into a single unit.

The node may be implemented with one processor.

An example of a structure of a node in an Ad-hoc network of an IEEE 802.11 system according to an embodiment of the present disclosure has been described with reference to FIG. 12, and another example of a structure of a node in an Ad-hoc network of an IEEE 802.11 system according to an embodiment of the present disclosure will be described with reference to FIG. 13.

Figure 13:
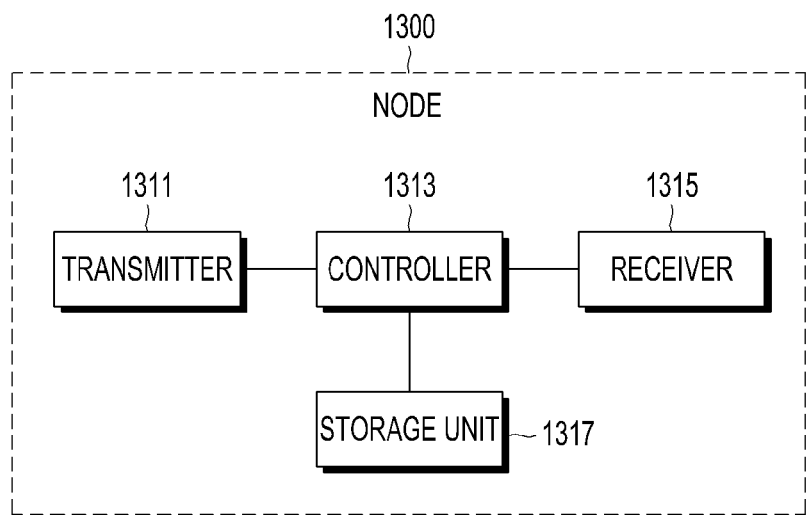
FIG. 13 schematically illustrates another example of a structure of a node in an Ad-hoc network of an IEEE 802.11 system according to an embodiment of the present disclosure.

FIG. 13 schematically illustrates another example of a structure of a node 1300 in an Ad-hoc network of an IEEE 802.11 system according to an embodiment of the present disclosure.

Referring to FIG. 13, the node 1300 includes a transmitter 1311, a controller 1313, a receiver 1315, and a storage unit 1317.

The controller 1313 controls the overall operation of the node 1300. More particularly, the controller 1313 controls the node 1300 to perform an operation related to an Ad-hoc mode operating operation according to an embodiment of the present disclosure. The operation related to the Ad-hoc mode operating operation according to an embodiment of the present disclosure is performed in the manner described with reference to FIGS. 3 to 11, and a description thereof will be omitted herein.

The transmitter 1311 transmits various signals and various messages, and the like to other nodes, and the like under a control of the controller 1313. The various signals, the various messages, and the like transmitted in the transmitter 1311 have been described in FIGS. 3 to 11 and a description thereof will be omitted herein.

The receiver 1315 receives various signals, various messages, and the like from the other nodes, and the like under a control of the controller 1313. The various signals, the various messages, and the like received in the receiver 1315 have been described in FIGS. 3 to 11 and a description thereof will be omitted herein.

The storage unit 1317 stores a program for an operation of the node 1300, various data, e.g., information related to the overall operation related to the Ad-hoc mode operating operation according to an embodiment of the present disclosure, and the like. The storage unit 1317 stores the various signals and the various messages which the receiver 1315 receives from the other nodes, and the like.

While the transmitter 1311, the controller 1313, the receiver 1315, and the storage unit 1317 are described in the node 1300 as separate units, it is to be understood that this is merely for convenience of description. In other words, two or more of the transmitter 1311, the controller 1313, the receiver 1315, and the storage unit 1317 may be incorporated into a single unit.

The node 1300 may be implemented with one processor.

As is apparent from the foregoing description, an embodiment of the present disclosure enables to operate an Ad-hoc mode in a wireless communication network.

An embodiment of the present disclosure enables to operate an Ad-hoc mode based on a power managing scheme in a wireless communication network.

An embodiment of the present disclosure enables to operate an Ad-hoc mode based on a neighbor node discovering scheme in a wireless communication network.

An embodiment of the present disclosure enables to operate an Ad-hoc mode thereby decreasing power which is consumed for discovering a neighbor node in a wireless communication network.

An embodiment of the present disclosure enables to operate an Ad-hoc mode thereby decreasing power which is consumed for detecting whether there is a message which targets a related node in a wireless communication network.

An embodiment of the present disclosure enables to operate an Ad-hoc mode thereby acquiring synchronization for transmission time among neighbor nodes in a wireless communication network.

An embodiment of the present disclosure enables to operate an Ad-hoc mode by generating a plurality of sub-groups which have the same time synchronization in a wireless communication network.

An embodiment of the present disclosure enables to operate an Ad-hoc mode thereby enabling to discover a neighbor node in a wireless communication network.

An embodiment of the present disclosure enables to operate an Ad-hoc mode thereby decreasing power which each node consumes in a wireless communication network.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital video disc (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for transmitting a beacon signal by a transmitting node in a wireless communication network, the method comprising:
    performing an initial scan process;
    accessing a group in which a neighbor node having a best channel status among neighbor nodes discovered through the initial scan process is included;
    transmitting a beacon signal by a beacon interval; and
    transmitting transmission information within a preset time from the beacon interval,
    wherein the group includes a plurality of neighbor nodes having the same beacon signal transmitting time.

2. The method of claim 1, wherein performing the initial scan process comprises:
    receiving, from at least one neighbor node, a beacon signal; and
    detecting, at least one group in which the at least one neighbor node is included based on the received beacon signal.

3. The method of claim 1, further comprising:
    if there is no neighbor nodes discovered through the initial scan process, generating a new group comprising the transmitting node; and
    transmitting a new beacon signal.

4. The method of claim 1, wherein the transmission information comprises at least one of information on the nodes which will transmit a message within the preset time, identifiers (IDs) of the nodes which will transmit the message within the preset time, and IDs of nodes which will receive the message.

5. The method of claim 1, wherein if the transmitting node is included in at least two group, receiving, from nodes included in each of the at least two group, transmission information for each of the at least two group,
    wherein each of the at least two group has a different beacon signal transmitting time.

6. The method of claim 1, further comprising:
    performing a full scan process to detect that the neighbor nodes is changed according to mobility of the neighbor nodes and a channel environment.

7. A method for receiving a beacon signal by a receiving node in a wireless communication network, the method comprising:
    receiving, from a transmitting node, a beacon signal by a beacon interval;
    obtaining a beacon signal transmitting time based on the beacon signal; and
    receiving, from the transmitting node, transmission information within a preset time from the beacon interval,
    wherein the transmitting node is included in a group comprising a plurality of neighbor nodes having the beacon signal transmitting time.

8. The method of claim 7, further comprising:
    discovering a neighbor node every a scan process interval,
    wherein the scan process interval is set to an integer multiple of the beacon interval.

9. The method of claim 8, wherein the transmission information comprises at least one of information on the nodes which will transmit the message within the preset time includes node identifiers (IDs) of the nodes which will transmit the message within the preset time, and node IDs of nodes which will receive the message.

10. The method of claim 7, further comprising:
    determining whether there is a message to be transmitted to the receiving node based on the transmission information; and
    if there is no message to be transmitted to the receiving node, receiving the beacon signal during the beacon interval, and transmitting into a sleep state.

11. A transmitting node transmitting a beacon signal in a wireless communication network, the transmitting node comprising:
    a controller configured to perform an initial scan process, and access a group in which a neighbor node having a best channel status among neighbor nodes discovered through the initial scan process is included; and
    a transmitter configured to transmit a beacon signal by a beacon interval, and transmit transmission information within a preset time from the beacon interval, wherein the group includes a plurality of neighbor nodes having the same beacon signal transmitting time.

12. The transmitting node of claim 11, wherein the transceiver is configured to receive, from at least one neighbor node, a beacon signal, and
the controller is configured to detect, at least one group in which the at least one neighbor node is included based on the received beacon signal.

13. The transmitting node of claim 11, if there is no neighbor nodes discovered through the initial scan process, the controller is configured to generate a new group comprising the transmitting node, and control the tranceiver to transmit a new beacon signal.

14. The transmitting node of claim 11, wherein the transmission information comprises at least one of information on the nodes which will transmit a message within the preset time, identifiers (IDs) of the nodes which will transmit the message within the preset time, and IDs of nodes which will receive the message.

15. The transmitting node of claim 11, wherein if the transmitting node is included in at least two group, receiving, from nodes included in each of the at least two group, transmission information for each of the at least two group,
wherein each of the at least two group has a different beacon signal transmitting time.

16. The transmitting node of claim 11, wherein the controller is configured to perform a full scan process to detect that the neighbor nodes is changed according to mobility of the neighbor nodes and a channel environment.

17. A receiving node for receiving a beacon signal in a wireless communication network, the receiving node comprising:
a controller configured to control a tranceiver, and obtain a beacon signal transmitting time based on the beacon signal
the tranceiver configured to receive, from a transmitting node, a first beacon signal at a first time, and receive, from the transmitting node, transmission information within a preset time from the beacon interval,
wherein the transmitting node is included in a group comprising a plurality of neighbor nodes having the beacon signal transmitting time.

18. The receiving node of claim 17, wherein the controller is configured to discovery a neighbor node every a scan process interval,
wherein the scan process interval is set to an integer multiple of the beacon interval,
wherein the information includes at least one of node identifiers (IDs) of the transmitting node nodes, and IDs of receiving nodes which will receive the message.

19. The receiving node of claim 17, wherein the transmission information comprises at least one of information on the nodes which will transmit the message within the preset time includes node identifiers (IDs) of the nodes which will transmit the message within the preset time, and node IDs of nodes which will receive the message.

20. The receiving node of claim 17, wherein the controller is configured to
determine whether there is a message to be transmitted to the receiving node based on the transmission information, control the transceiver is configured to receive the beacon signal during the beacon interval
if there is no message to be transmitted to the receiving node, and transmit into a sleep state.

\* \* \* \* \*